March 14, 1967 H. NEWMAN ETAL 3,309,129
DETACHABLE VEHICLE DOOR BUMPER
Filed March 30, 1965
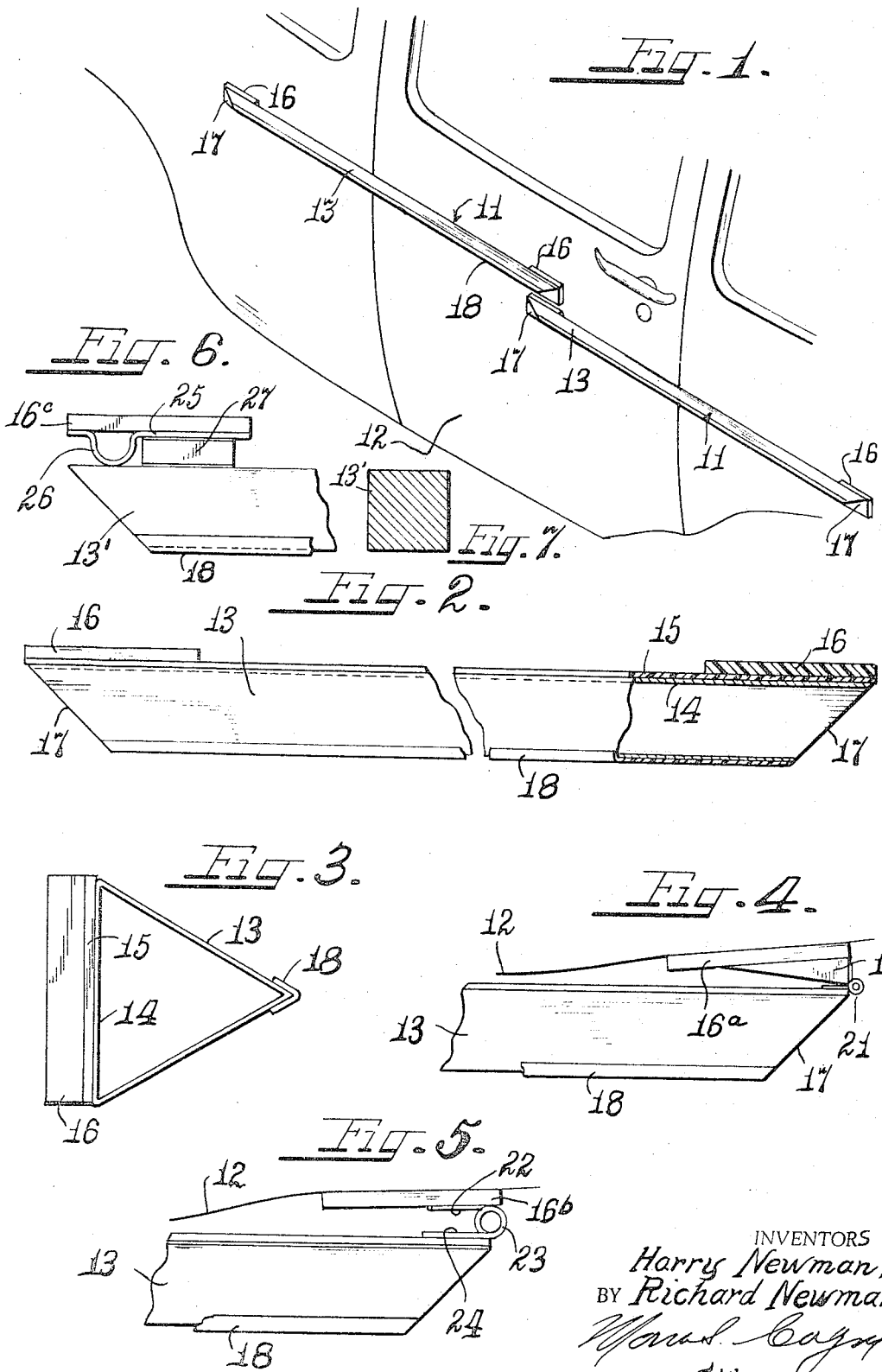
INVENTORS
Harry Newman, and
BY Richard Newman

United States Patent Office 3,309,129
Patented Mar. 14, 1967

3,309,129
DETACHABLE VEHICLE DOOR BUMPER
Harry Newman, 2231 E. 67th St., and Richard Newman, 7256 S. Euclid Ave., both of Chicago, Ill. 60649
Filed Mar. 30, 1965, Ser. No. 443,939
1 Claim. (Cl. 293—1)

The invention relates to improved means for protecting car bodies against injury by adjoining cars in a parking lot, garage or the like. Because of the desire to park as many cars as possible in a given area in most parking lots and garages it is customary to park cars as close as possible to each other. As a result of such parking, when the door of one car is opened, its outer edge frequently strikes the body of the adjacent car, damaging the surface and finish of the second vehicle. In the more current makes of cars the doors are relatively wide and it is quite difficult at times to prevent the door of one car to come into accidental contact with the body of an adjacent vehicle and thereby dent or otherwise mar the same.

More particularly, the device of the present invention is in the nature of a bumper or guard that can be readily and detachably mounted in a position on the side of a vehicle so as to protect the same against being damaged by the opening of a door of an adjacent vehicle. It comprises essentially, an elongated bar-like body which may be fabricated from suitable material, preferably wood although other material such as plastics or metal may be used, and having at its ends and on the surface thereof to be placed toward the vehicle body, a pair of elastomer (rubber or vinyl) based permanent multipole magnets useful to attach the bump guard to the vehicle. The magnets may be secured firmly to the bar-like body, or they may be movably connected thereto. The latter form is particularly useful when the vehicle to which it is attached has an extreme profile curvature. In order to avoid the possibility of the bump guard being longitudinally displaced should it be struck at either end by a door of an adjacent vehicle, the ends thereof are inclined at an angle so as to deflect such impact without its becoming displaced.

Preferably, the face of the bar-like body disposed toward the body of the vehicle on which it is mounted is surfaced with a layer of soft rubber or vinyl, if plastic or metal is used, to avoid marring the vehicle body should it be bowed inwardly when struck by the door of an adjacent vehicle. Also, in order to avoid marring the adjacent vehicle, the outwardly disposed face or edge of the bar-like body is capped with a strip of hard rubber, vinyl or other cushioning material, if metal or plastic is used. If wood is used there is no need for the strip.

It is therefore an object of the invention to provide a novel and improved bump guard adapted to be applied to the side of a vehicle for protecting the latter.

Another object is to provide a bump guard having means whereby the same may be quickly and conveniently applied to or removed from the side of the body.

Another object is to provide a bump guard of the character referred to that is ruggedly constructed and in a manner to resist accidental displacement.

Another object is to provide a bump guard of the character referred to which embodies novel means to protect both the vehicle on which it is mounted and a closely adjacent vehicle from being marred or otherwise damaged by its presence.

Another object is to provide a bump guard of the character referred to which is not expensive to manufacture and which is very efficient in use.

The structure by means of which the above noted and other objects and advantages of the invention are attained will be described in the following specification, taken in conjunction with the accompanying drawings, showing preferred illustrative embodiments of the invention, in which:

FIG. 1 is a perspective view of the bump guard mounted on the outside surface of the side of a vehicle body.

FIG. 2 is a top plan view of one embodiment of the bump guard, showing it partially in section and with its medial portion broken away.

FIG. 3 is an end elevational view of one embodiment of the bump guard.

FIG. 4 is a plan view of one of two like ends of a modified form of bump guard.

FIG. 5 is a plan view of one of two like ends of another form of the bump guard.

FIG. 6 is a plan view of one of two like ends of still another form of bump guard made of wood.

FIG. 7 is the transverse sectional view of the bump guard shown in FIG. 6 with the cushioning member 18 removed.

Referring to the exemplary forms of the bump guard illustrated in the accompanying drawings, and particularly to the embodiment illustrated in FIGS. 1 to 3, inclusive, a pair of bump guards 11 are shown in FIG. 1 attached to the outside surface of the side wall 12 of a vehicle body. The bump guards are arranged on the vehicle body in a horizontal position substantially end to end so as to extend longitudinally therealong in a manner and in a location to protect the vehicle body against being damaged when a door of a vehicle parked closely alongside it is opened.

Each bump guard 11 comprises an elongated bar-like body 13, which may be fabricated from wood having the desired characteristics for the purpose, or of sheet material and is substantially triangular in section. Also, it could be fabricated from vinyl or other plastic material. When made of metal its base wall 14 preferably is covered on its outside face with a layer 15 of soft rubber, vinyl, or other cushioning material, so as to protect the vehicle upon which it is mounted from being marred in any fashion by reason of the guard being deflected inwardly against said vehicle when subjected to impact resulting from it being struck by the door of an adjacent car. If made of wood, the guard does not need any cushioning material as shown in FIG. 6. Magnets 16, preferably an elastomer (rubber or vinyl) based permanent multipole magnet, are attached firmly to the outside surface of the back or base wall 14 of the bar 13, one at least at each end thereof.

To position and secure the bump guard to the side wall of a vehicle it is merely required that it be held in the desired location and moved toward the vehicle wall. The magnets 16 will be attracted to and will securely hold the bump guard in place on the vehicle body wall. Were the ends of the bar 13 perpendicular to its length there is the possibility of dislodging the bump guard from the vehicle should it be struck on the end by the opening of a door of an adjacent vehicle. This is overcome by forming the ends 17 of the guard bar 13 at an angle as shown best in FIG. 2. A yieldable cushioning member 18 is secured over the apex of the bar 13 so as to minimize possible damage to car doors striking same. This cushioning member 18 may be eliminated when wood is used.

In instances where the vehicle body has an extreme profile curvature, it may be somewhat difficult to engage firmly mounted magnets 16 with the wall of the vehicle. To overcome this undesirable characteristic the structures illustrated in FIGS. 4, 5 and 6 may be better suited for this type of application.

Referring to the FIG. 4 structure, the bar 13, which may be like the one previously described, is provided at its end (one shown) with hingedly mounted magnets 16a that are like those previously described, and which are spaced rearwardly from the back surface of said bar. As shown, this may be accomplished by securing a wedge shaped block 19 to the magnet 16a and then hingedly connecting said block to the outside surface of the base of the bar 13, as at 21. It should be evident that the bar 13 is held spaced from the vehicle body to accommodate excessive curvature thereof, and that the hingedly mounted magnets 16a may adjust themselves readily to the surface contour of the side wall of the vehicle body 12.

The FIG. 5 disclosure is basically like that shown in FIG. 4, except that here no wedge blocks are used. Instead, the magnets 16b (one shown) are mounted firmly on one leg 22 of a coil spring type hinge 23, the other leg 24 of which is secured firmly to the back surface of the bump bar 13.

In the FIG. 6 disclosure, the bump bar 13' is made of solid wood and has secured thereto adjacent each end a magnet 16c (one shown) which in this instance mounts firmly on its back surface, a substantially U-shaped bearing element 25 made of suitable material such as steel. As shown, the bowed portion 26 of said element is located closely adjacent to one end of the magnet and is adapted to bear against the back surface of the bump bar 13'. A mass 27 of resiliently compressible material is arranged between the magnet 16c and the bump bar and is adhesively secured to both members so as to mount the magnet on said bump bar. In use, when external pressure is applied to the bump bar, the mass 27 will yield and relative angular movement between the magnet and bump bar is permitted by reason of the bowed portion 26 rocking on the contacted bump bar surface. The mass 27 readily permits such rocking action. It has been found that most satisfactory results are obtained with the embodiment shown in FIG. 6 and made of wood when the bar is of substantially rectangular cross section as shown in FIG. 7.

In the embodiments illustrated in this application, it may, under certain circumstances, also be desirable to use a suitably mounted magnet intermediate the ends of said bar. It may also be added that while the ends of the bar are shown as formed at an angle, this would not necessarily be required with the use of an intermediate magnet.

Although we have described preferred embodiments of the invention, in considerable detail, it will be understood that the description thereof is intended to be illustrative, rather than restrictive, as many details of the structure disclosed may be modified or changed without departing from the spirit or scope of the invention. Accordingly, we do not desire to be restricted to the exact constructions described.

We claim:

A bump protector for automobiles comprising: an elongated rigid bar, magnet means connected to an external surface of said bar, said magnet means projecting outwardly from said external surface and adapted to detachably mount said bar on an automobile wall and in spaced relationship therewith, said magnet means comprising a permanent magnet connected to said external surface adjacent each end of said bar, and a resilient spacer positioned between each of said magnets and said bar whereby said bar ends are capable of limited rocking movement with relation to said magnets.

References Cited by the Examiner

UNITED STATES PATENTS

| | | | |
|---|---|---|---|
| 1,341,917 | 6/1920 | Limacher | 293—74 |
| 1,619,451 | 3/1927 | Weymouth | 293—62 X |
| 2,562,620 | 7/1951 | Krueger | 293—62 |
| 2,734,765 | 2/1956 | Henderson et al. | 293—62 |
| 3,065,724 | 11/1962 | Trill | 114—219 X |
| 3,110,516 | 11/1963 | Sukala | 293—65 |
| 3,131,960 | 5/1964 | Popp | 293—1 |
| 3,147,176 | 9/1964 | Haslam | 293—54 |

ARTHUR L. LA POINT, *Primary Examiner.*

MILTON BUCHLER, *Examiner.*

H. BELTRAN, *Assistant Examiner.*